E. G. CHAMBERS.
Sheep Shears.
No. 16,720.
Patented March 3, 1857.
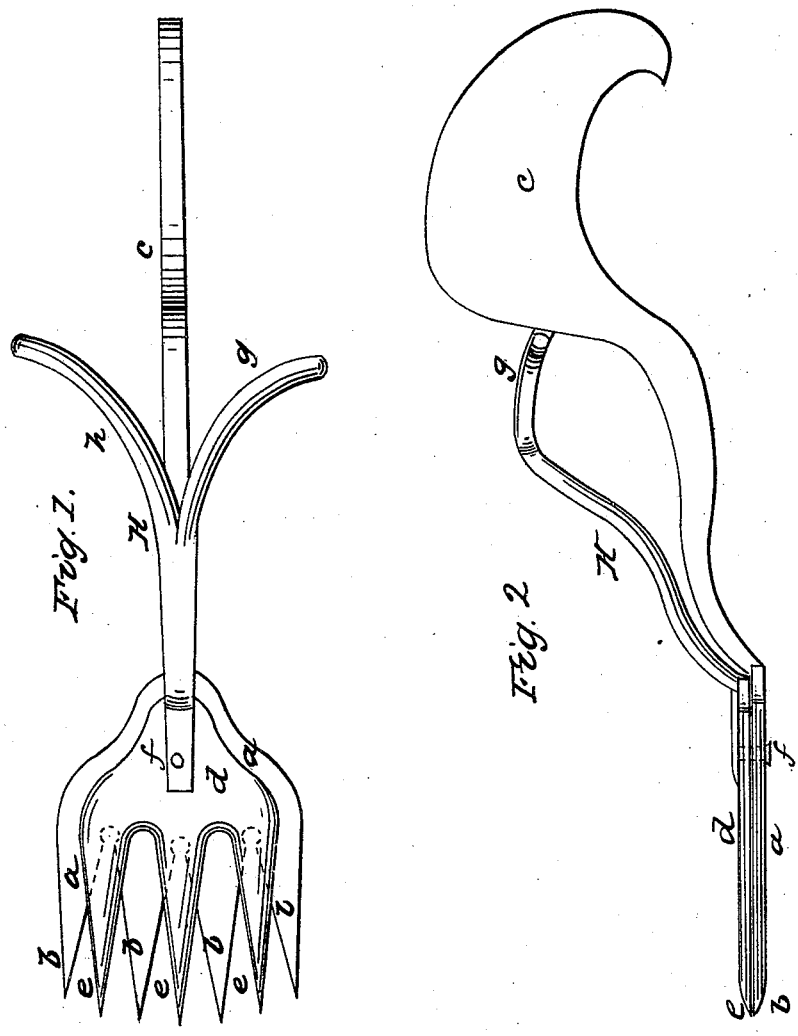

UNITED STATES PATENT OFFICE.

EDWARD G. CHAMBERS, OF BUCYRUS, OHIO.

SHEEP-SHEARS.

Specification of Letters Patent No. 16,720, dated March 3, 1857.

*To all whom it may concern:*

Be it known that I, E. G. CHAMBERS, of Bucyrus, in the county of Crawford and State of Ohio, have invented a new and useful Improvement in Sheep-Shears; and I do hereby declare that the following is a full, clear, and exact description of the construction and operation of the same, reference being had to the annexed drawing, forming part of this specification, in which—

Figure 1 is a top view—: and Fig. 2 is a side view of the shears.

Similar characters of reference in the several figures denote the same part.

The implement hereinafter to be described consists of two series of cutters, one stationary and the other capable of vibration upon the first, about a pin connecting the plates on which said cutters are formed; the vibrating cutter plate having a bifurcated handle embracing the stock of the stationary cutter plate. So that while the operator grasps the said stock in the palm of his hand with three fingers, the vibration of the cutters will be effected by the thumb and forefinger of the same hand acting upon the branches of the aforesaid bifurcated handle. This construction, whereby the vibration is produced as above stated constitutes my invention the details of which are as follows.

In the drawing $a$ is the lower plate, having teeth or cutters $b$, and a stock $c$ to receive the grasp of the operator. The upper plate $d$ has cutters $e$, and is connected with the lower plate by a pin $f$; the movement about which of said upper plate causes the cutting edges of the teeth to produce shear cuts. The vibrating plate has a handle H running rearward near the stock $c$, and then separating into two branches $g$ and $h$, as shown in Fig. 1.

By this construction the operator can grasp the stock with the palm of his hand and three fingers, and with the thumb and forefinger of the same hand press alternately on the branches $g$ $h$ and thus produce the necessary vibration to effect the cut required.

What I claim and desire to secure by Letters Patent, is—

The fixed plate stock $c$, as described, combined with the bifurcated handle of the vibrating cutters substantially as and for the purposes specified.

In testimony whereof, I have hereunto signed my name before two subscribing witnesses.

EDWARD G. CHAMBERS.

Witnesses:
 GEO. PATTEN,
 JOHN S. HOLLINGSHEAD.